Sept. 9, 1958

M. G. CROSBY 2,851,532

MULTIPLEX COMMUNICATION SYSTEM

Filed April 21, 1953

INVENTOR.
MURRAY G. CROSBY
BY James and Franklin
ATTORNEYS 2,851,532
Patented Sept. 9, 1958

2,851,532

MULTIPLEX COMMUNICATION SYSTEM

Murray G. Crosby, Riverhead, N. Y.

Application April 21, 1953, Serial No. 350,164
25 Claims. (Cl. 179—15)

Figure 1:
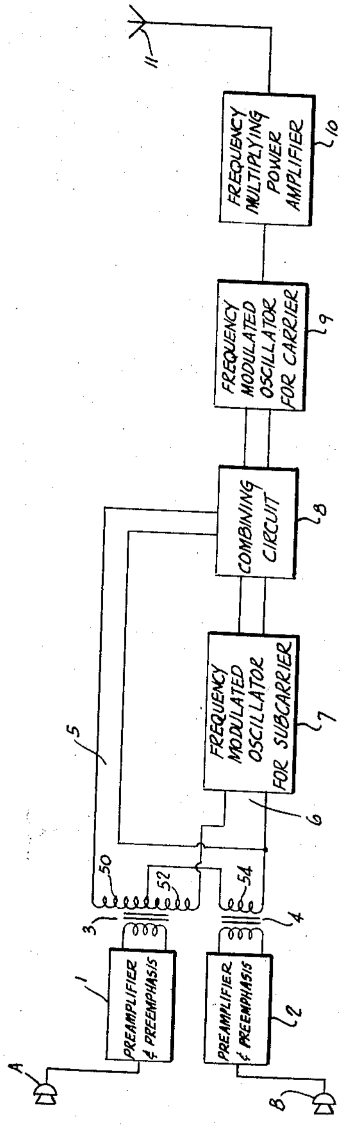

This invention relates to multiplex communication systems, and more particularly to the binaural transmission and reception of sound.

In the prior art of binaural sound transmission, various combinations of transmitting systems have been used for transmitting the output of the second microphone, which is added to the monaural sound transmitting system. In one of these arrangements, microphone A is transmitted via an amplitude modulation transmitter in the standard broadcast band, and microphone B is transmitted via an FM transmitter in the standard FM broadcast band. In another system, microphone A is transmitted on the main channel of an FM transmitter, and microphone B is transmitted via the same transmitter but on a subcarrier at a superaudible frequency. Other combinations of transmission mediums may be used to transmit the two channels which are required.

A basic difficulty encounterd in the systems of the two examples just given, is that the efficiency of transmission of the two channels is not equal. For instance, in the transmission of the two channels by AM and FM, the signal-to-noise ratio of the AM system is usually inferior to that of the FM system. Likewise, in the multiplex FM system, the signal-to-noise ratio realized on the subcarrier channel is inferior to that realized on the main program channel. This inequality unbalances the quality of reception obtained from the system when both channels are being received, and produces an annoying detraction to the realism of the reception.

One object of the present invention is to improve the signal-to-noise ratio of that channel which has the poorer signal-to-noise ratio in a dual channel transmission system. A more particular object is to balance or equalize the signal-to-noise ratios on the multiplex channels.

Still another object is to generally improve binaural systems, and to apply the foregoing objects to binaural multiplex systems. Another object is to provide an improved, compatible reception of monaural sounds for listeners who are not equipped with the necessary binaural receiving equipment.

In general, according to my invention, two messages are transmitted on two communication channels by adding the messages and transmitting the resulting summation signal over one channel, and subtracting the messages and transmitting the resulting difference or subtraction signal over the other channel. Both the summation and subtraction signals are transmitted with substantially full frequency range. At the receiver the two signals are so added as to reproduce one of the messages, and are so subtracted as to reproduce the other message. Thus in the case of binaural transmission, instead of transmitting the output of one microphone over one channel, and the output of the other microphone over the other channel, the sum of the outputs of the two microphones is transmitted over one channel, and the difference of these outputs is transmitted over the other channel, at substantially full frequency range. At the receiving end the receiver outputs are combined in such a manner as to separately reproduce the responses of the individual microphones in the separated speakers.

Figure 2:
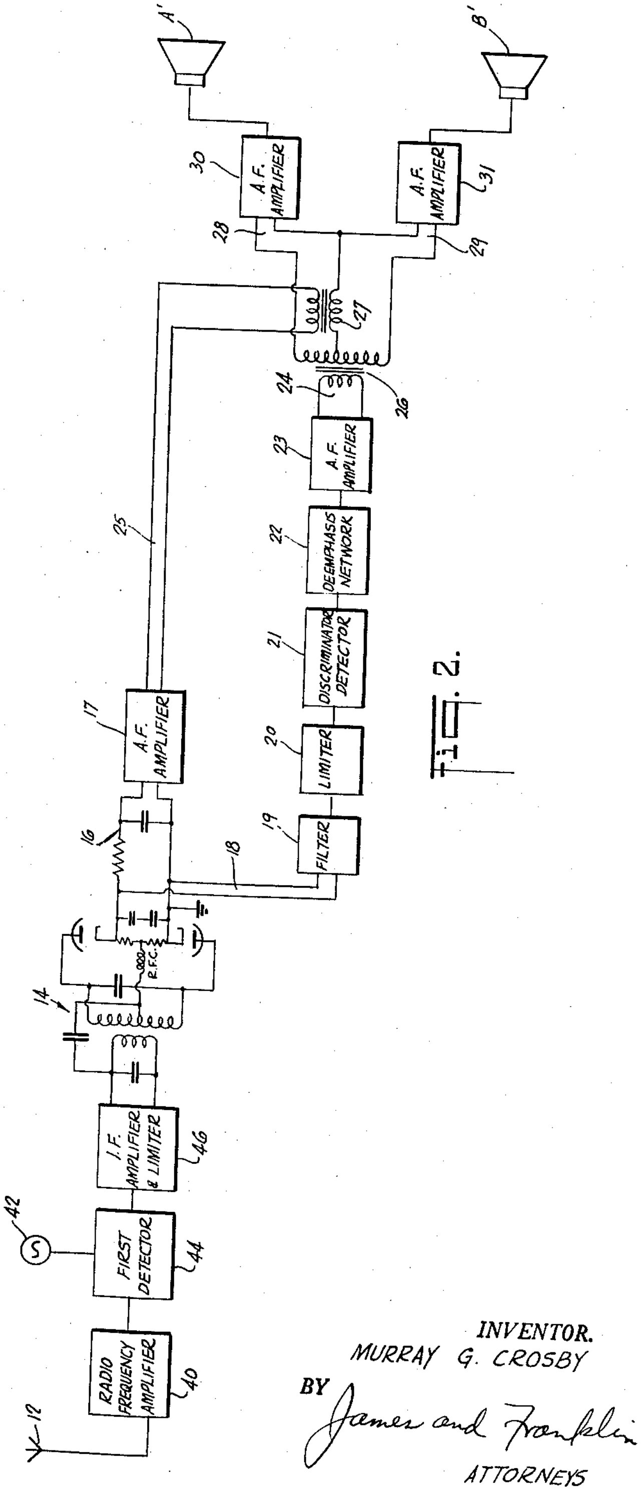

To accomplish the foregoing general objects, and other more specific objects which will hereinafter appear, my invention resides in the method steps and apparatus elements, and their relation one to another, as are hereinafter more particularly described in the following specification. The specification is accompanied by a drawing, in which:

Fig. 1 is a schematic diagram of a transmitter embodying features of my invention; and Fig. 2 is a schematic diagram of a receiver embodying features of my invention.

Referring to the drawing, and more particularly to Fig. 1, the system there shown uses an FM transmitting system with a superaudible subcarrier multiplexed to provide the second channel. The frequency modulated oscillator 9, together with the frequency multiplier and power amplifier 10, comprise a standard frequency modulation transmitter, the output of which is transmitted on antenna 11. The modulator 9 of this transmitter is arranged to accept not only the main program which may extend up to 15 kilocycles, but also the superaudible subcarrier frequency which may center at approximately 45 kilocycles.

Microphones A and B are the two spaced microphones of the binaural system. The outputs of these microphones are amplified by pre-amplifiers 1 and 2, which may also contain the usual pre-emphasis network used in FM broadcast transmission. These increase the amplification for the higher frequencies in a manner to effect an improvement in signal-to-noise ratio as described in my article, "The service range of frequency modulation" published in the January 1940 issue of "RCA Review." The outputs of the units 1 and 2 are fed to transformers 3 and 4.

The connections of the secondaries of these transformers are important, and from examination of these connections it will be seen that the conductors 5 provide a summation of the outputs of microphones A and B, and that the conductors 6 provide a difference combination or subtraction of the two microphone outputs. This is so because secondaries 50 and 52 are reversed in phase, relative to secondary 54, so that if secondaries 50 and 54 are wired to be additive, then secondaries 52 and 54 must be considered subtractive.

The unit 7 is a frequency modulated oscillator for the subcarrier frequency. It is designed to handle a deviation of approximately 15 kilocycles. The difference or subtraction signal from conductors 6 acts to modulate the subcarrier, and the modulated subcarrier is supplied to a combining circuit 8. The summation signal from conductors 5 is also supplied to the combining circuit 8. It will be understood that the arrangement could be reversed, with the summation signal used to modulate the subcarrier, but the present arrangement is greatly preferred, in order to take care of monaural receivers, as later described. Considering the invention more broadly, the two microphones may be thought of as providing two different messages, not necessarily binaural. In such case it may be said that the two messages are added to provide a summation signal; that the two messages are subtracted to provide a subtraction signal; and that the two signals are transmitted over two channels. In the present case one of the signals is used to modulate a carrier, and the other a subcarrier.

The combining circuit 8 may be of any desired or well known type, such as a simple resistor network, or an electron-device arrangement, by which I mean circuits having transistors as well as vacuum tubes, and the output of the combining circuit is supplied to the frequency modulated oscillator 9 where it serves to modulate the carrier. Thus in the present case the summation signal modulates the FM transmitter in an audible range of from 30 cycles to 15,000 cycles, and the subcarrier modulates the FM transmitter in a superaudible range of from approximately 20 to 75 kilocycles.

Referring now to Fig. 2, the transmitted wave is received via an antenna 12 by a frequency modulation receiver. This may be conventional in utilizing a radio frequency amplifier 40 and a heterodyne unit including a local oscillator 42 and a first detector 44 followed by an intermediate frequency amplifier and limiter 46. The output of this may be fed to a discriminator detector generally designated 14, which may be of the Seeley type. This is described more fully in U. S. Patent 2,121,103, issued June 21, 1938.

The output of the differential detectors forming a part of the unit 14 is fed to two branches. One of these branches includes the de-emphasis network 16 which is connected to an audio frequency amplifier 17. The circuit acts also as a selector or filter which accepts the audio frequency range and excludes and acts as a rejection filter for the subcarrier. The other branch shown by conductors 18 leads to a subcarrier receiver which selects the subcarrier in the range from 20 to 75 kilocycles.

The subcarrier receiver comprises a bandpass filter 19 which excludes audio frequency and acts as a high impedance to audio frequencies but which passes the subcarrier. The unit 19 may be a high-pass filter which cuts off at approximately 20 kilocycles, instead of being a bandpass filter.

Following the filter 19 there is a limiter 20 which removes any amplitude modulation on the FM subcarrier. This is followed by a discriminator detector 21, which again may be of the Seeley type, and which detects the frequency modulation, and so derives an audio frequency output which is supplied to a de-emphasis network 22. This in turn leads to an audio frequency amplifier 23 which delivers the modulation of the subcarrier at terminals 24 to a transformer 26 having oppositely phased secondaries.

The audio frequency output on conductors 25 is supplied to another transformer 27. It will be seen that these transformers are arranged in much the same fashion as was described in connection with Fig. 1, and accordingly provide for summation and difference outputs. More specifically, if at the terminals 28 the signals are considered to be added, then at the terminal 29 the signals are subtracted. From an algebraic viewpoint, and using the letter A for the massage from microphone A and the letter B for the message from microphone B, at terminals 28 the output is $(A+B)+(A-B)=2A$. At terminals 29 the output is $(A+B)-(A-B)=2B$. Thus the input to amplifier 30 corresponds to the message from microphone A alone, and the input to amplifier 31 corresponds to the mesage from microphone B alone. These are connected to speakers A′ and B′ which are spaced an appropriate distance apart, and speaker A′ responds to microphone A alone, while speaker B′ responds to microphone B alone.

It will be understood that speakers A′ and B′ might also be replaced by headphones, with the message from microphone A connected to the headphone on one ear, and the message from microphone B supplied to the headphone on the other ear. Such a headphone arrangement would give a truer binaural reproduction, but the loudspeaker system would ordinarily be preferred because it gives a stereophonic effect without the inconvenience of wearing headphones.

The description as so far given has not brought out a main feature of the invention, namely, the leveling or equalization of the signal-to-noise ratios on the two channels. However, it will already be understood in a general way that with my system message A is communicated partially over both channels, and similarly message B is communicated partially over both channels, so that the messages are subjected to similar treatment despite possible differences in the channels, and this is in contrast with the more usual and more elementary system in which one message is sent wholly over one channel alone while the other message is sent wholly over the other channel alone.

In the FM system shown, I have found that the signal-to-noise ratio on the subcarrier channel may be as much as 20 or 30 db poorer than that on the main program channel. A typical signal-to-noise ratio is 60 db on the main program channel from 30 cycles to 15 kilocycles and 40 db on the subcarrier channel transmitted at approximately 45 kilocycles. Thus, the signal might be one volt and the noise .001 volt on the main channel, and the signal one volt and the noise .01 volt on the subcarrier channel. If the signal were transmitted so that microphone A feeds the main program and microphone B the subcarrier channel, without the $A+B$ and $A-B$ combinations of my invention, the received outputs would have signal-to-noise ratios which are 20 db apart. However, if the system of this invention is used, the following noise distribution takes place.

At terminals 25, the noise condition of the example given above would provide $(A+B)+.001$ volt of noise. The output from terminals 24 would provide $(A-B)+.01$ volt of noise. At terminals 28, the output would be $(A+B)+.001$ noise volt$+(A-B)+.01$ noise volt which is equal to $2A+\sqrt{.01^2+.001^2}$ noise volt. The summation of the noises under the radical is, for all practical purposes, equal to .01 noise volt. Thus the output from terminals 28 is $2A+.01$ noise volt. It will be seen that the signal has been doubled in strength so that the signal-to-noise ratio is 6 db better than that which existed on the subcarrier channel.

At terminals 29, the signal plus noise conditions are given by the difference between $(A+B)+.001$ noise volt and $(A-B)+.01$ noise volt, which turns out to be $2B+.01$ noise volt. This is a signal-to-noise ratio equal to that presented at terminals 28. Thus the signal-to-noise ratio has been equalized to a value 6 db better than that on the poorer channel, which happens to be the subcarrier channel. This is a highly desirable accomplishment because with the binaural reproduction system, the transmission is only as good as the poorer channel. Such an improvement of 6 db in the signal-to-noise ratio of the poorer channel therefore appears as a 6 db power gain in the overall transmission system.

In the system described above, it was assumed that the average program level of the $A+B$ combination and the $A-B$ combination is the same. This situation will be the case when the microphones are spaced relatively far apart. However, if like microphones are placed close together, the $A+B$ combination will provide a level of output which is greater than that of the $A-B$ combination. Under these circumstances, the input to the subcarrier generator $(A-B)$ is preferably increased in level, and a corresponding reduction of level is preferably introduced in the output of the subcarrier receiver. In other words the levels preferably are equalized during transmission. The result is an even further improvement in signal-to-noise ratio. Let it be assumed that the output of the $A-B$ combination is 6 db less than the output of the $A+B$ combination. This would allow the modulation level to be raised 6 db at the input of the subcarrier generator. At the output of the subcarrier receiver, the level would be lowered 6 db so that at the combination the signal and noise would be as follows:

The output of the main program channel would be $(A+B)+.001$ noise volt. The output of the subcarrier channel would be $2(A-B)+.01$ noise volt. For the combination, an attenuation of 6 db would be introduced in the output of the subcarrier receiver so its output would become $(A-B)+.005$ noise volt. The summation output would thus be $2A+.005$ noise volt and the difference output would be $2B+.005$ noise volt. As a result, this difference in level at terminals 5 and 6 appears as a signal-to-noise ratio improvement. Where the level was taken as equal, two signal-to-noise ratios of 46 db each were provided in the two channels. Where the level was 6 db different, the signal-to-noise ratios appear as two 52 db signal-to-noise ratios, at the separate outputs. It can be seen that from this viewpoint it would be advantageous to locate the microphones close together so that the difference output produces cancellation over a larger percentage of the audio frequency range, and therefore produces a lower signal level for the difference channel. However, binaural transmitting practices may call for a rather wide separation of microphones in order to emphasize the stereophonic effect and add to the realism.

The amount of gain which may be obtained by utilizing the difference in level between the summation channel and the difference channel is a factor which must be determined by experiment. It is directly related to the distance between the two microphones. If two like microphones are close, the difference output will produce practically complete cancellation for the lower (though not the higher) audio frequencies, with cancellation becoming progressively less as the space between the microphones becomes a larger fraction of a wavelength of the transmitted audio frequency. As the microphones are spaced farther, the cancellation will become less. Other factors which will affect the amount of cancellation will be distance between the orchestra or speaker and the microphones, and the angle of transmission of the particular sound source with respect to the microphones.

In applying such a multiplex transmitting system to binaural sound on either an FM broadcast transmitter or a television sound channel, an important advantage is obtained by this summation-difference type of operation. If the listener does not have the subcarrier or binaural equipment, and wants to listen to the program in a monaural manner, he can do so, and will be listening to the summation transmission. The system is not only "compatible," but responds to the balanced pick-up of the two microphones. If the listener were using a monaural receiver on a transmission system of the kind previously known which merely applied two microphones separately to the two channels, he would be receiving one channel, and hearing the output of one microphone alone. If the spacing between the microphones is large, such a reproduction is unbalanced, for the microphone is located at one side of the stage, instead of its proper position in the center. This advantage of my invention is of great practical value, since it allows binaural transmission without loss of a "compatible" monaural reproduction which is properly balanced. The monaural receiver needed would be a conventional FM receiver, already in wide use.

It is believed that the method and apparatus of my invention, as well as the advantages thereof, will be apparent from the foregoing detailed description. Although I have shown and described a system in which one channel is a frequency modulation channel and the other is a superaudible subcarrier, it will be understood that the invention in some aspects, such as the increased amplification of the subtraction signal before transmission, is applicable to any system in which two messages are to be transmitted over two channels, whether they be amplitude modulation, phase modulation, frequency modulation, or any combination of any two of the same, or any combination with subcarriers of the same.

It will also be apparent that this combination of summation and difference transmission is applicable to any dual channel system where it is desired to have an improved signal-to-noise ratio on the poorer of two channels. For instance, if it were desired to transmit two voice channels over two lines, one of which had so poor a signal-to-noise ratio that it was unusable, this summation-difference arrangement would allow in improvement of the poorer channel by 6 db, so that two mediocre but usefully usable channels might result, instead of one channel of unnecessarily high signal-to-noise ratio, and another of unworkably poor signal-to-noise ratio.

It will be understood that the system is not limited to binaural transmission. It will be also apparent to those skilled in the art that addition and subtraction by means of a transformer combination as here shown is not essential. Arrangements of phase inverters and resistance networks may also be used. In some cases, under conditions of mass production of receiving equipment, such alternatives might prove preferable. However, the principles of the invention, using an algebraic-like addition and subtraction at both the transmitter and the receiver, would remain the same.

It will therefore be understood that while I have shown and described my invention in a preferred form, changes may be made without departing from the scope of the invention, as sought to be defined in the following claims. In the claims the term "speaker" is intended to include other translating devices, including a headphone.

The broad reference in some claims to transmitting the summation and subtraction signals over two separate channels, is intended to include channels of any kind, including two different frequency AM, FM, or PM channels, or combinations of any two of the said types, or any combination with subcarriers of the same, or other multiplex systems such as the separated upper and lower sidebands of a single-sideband twin-channel system. However, many claims deal specifically with a frequency modulation carrier having a superaudible subcarrier, which is an advantageous and preferred form of the invention. In the claims, when dealing with modulation, the expression "substantially the full frequency range" of the audio signal is intended to mean an audio frequency range large enough to produce a substantial improvement in signal-to-noise ratio. Also, the expression "substantial improvement in signal-to-noise ratio" does not mean an increase in ratio in both channels. For example, if the main channel has a signal-to-noise ratio of 60 db, and the subcarrier channel has a signal-to-noise ratio of 40 db, the A and B outputs from the receiver may have a signal-to-noise ratio of say 46 db each, without any increased amplification of the subtraction signal before transmission, and they may have a signal-to-noise ratio of 52 db each if there is an increased amplification of the subtraction signal by say 6 db, and even higher if the increase in amplification of the subtraction signal is greater. These are all considered an "improvement" in signal-to-noise ratio because the increase in the poorer channel is important, compared to the decrease in the better channel, and also because equalization in both channels is itself desirable.

I claim:

1. Apparatus for transmitting two messages on two carrier frequency channels, said apparatus comprising means to add the messages to obtain a summation signal, means to generate carrier waves, means to modulate the carrier waves by means of the summation signal, means to subtract the messages to obtain a subtraction signal, means to raise the level of the subtraction signal more than the summation signal is raised, means to modulate carrier waves by means of said subtraction signal, and means to transmit the modulated carrier waves.

2. Apparatus for communicating two messages on two high frequency communication channels, said apparatus comprising means to add the messages to obtain a summation signal, means to generate carrier waves, means to modulate the carrier waves by means of the summation signal, means to subtract the messages to obtain a subtraction signal, means to raise the level of the subtraction signal more than the summation signal is raised, means to modulate carrier waves by means of said subtraction signal, means to transmit the modulated carrier waves, and a receiver including means to demodulate the carrier waves to derive the signals, means to raise the level of the subtraction signal less than the summation signal is raised in order to help restore the original relationship of level, means to add the signals in order to reproduce the first message, and means to subtract the signals in order to reproduce the second message.

3. Apparatus for receiving two messages transmitted on two high frequency communication channels, the sum of the messages being a summation signal sent on one channel, and the difference of the messages being a subtraction signal sent on the other channel, said receiver apparatus comprising means to demodulate carrier waves to derive the signals, means to raise the level of the subtraction signal less than the summation signal is raised, means to add the signals in order to reproduce the first message, and means to subtract the signals in order to reproduce the second message.

4. Apparatus for transmitting two messages on a frequency modulation carrier, comprising means to add the messages to obtain a summation signal, means to subtract the messages to obtain a subtraction signal, means to raise the level of the subtraction signal more than the summation signal is raised, a subcarrier generator, means to modulate the subcarrier by means of the subtraction signal, means to combine the summation signal and the modulated subcarrier, a carrier generator means to frequency modulate the main carrier by the combined signal.

5. Apparatus for communicating two messages on a frequency modulation carrier, comprising means to add the messages to obtain a summation signal, means to subtract the messages to obtain a subtraction signal, means to raise the level of the subtraction signal more than the summation signal is raised, a subcarrier generator, means to modulate the subcarrier by means of the subtraction signal, means to combine the summation signal and the modulated subcarrier, a carrier generator, means to frequency modulate the main carrier by the combined signal, and receiver apparatus including means to demodulate the carrier waves, means to separate the summation and subtraction signals, means to raise the level of the subtraction signal less than the summation signal is raised in order to help restore the original relationship of level, means to add the signals to obtain one of the messages, and means to subtract the signals to obtain the other message.

6. Apparatus for receiving two messages on a frequency modulation carrier, the sum of the messages being a summation signal sent on the carrier, the difference of the messages being a subtraction signal sent on a subcarrier, said receiver apparatus comprising means to demodulate the carrier waves, means to separate the summation and subtraction signals, means to raise the level of the subtraction signal less than the summation signal is raised, means to add the signals to obtain one of the messages, and means to subtract the signals to obtain the other message.

7. Apparatus for binaural transmission, said apparatus comprising spaced microphones, means to add the microphone outputs to obtain a summation signal, means to subtract the microphone outputs to obtain a subtraction signal, means to amplify the subtraction signal more than the summation signal by a factor "K," means to transmit the summation signal over one channel, and means to transmit the subtraction signal over another channel.

8. Apparatus for binaural communication, said apparatus comprising spaced microphones, means to add the microphone outputs to obtain a summation signal, means to subtract the microphone outputs to obtain a subtraction signal, means to amplify the subtraction signal more than the summation signal by a factor "K," means to transmit the summation signal over one channel, means to transmit the subtraction signal over another channel, and receiver apparatus including means to attenuate the subtraction signal relative to the summation signal by the factor "K," means to add the two signals to reproduce one microphone output, means to subtract the two signals to reproduce the other microphone output, spaced speakers, means to supply the reproduced output of one microphone to one of the speakers, and means to supply the other reproduced microphone output to the other speaker.

9. Apparatus for binaural reception of messages from spaced microphones, the added microphone outputs being a summation signal sent over one channel, the subtracted microphone outputs being a subtraction signal sent over another channel, said receiver apparatus comprising means to attenuate the subtraction signal relative to the summation signal by a factor "K," means to add the two signals to reproduce one microphone output, means to subtract the two signals to reproduce the other microphone output, spaced speakers, means to supply the reproduced output of one microphone to one of the speakers, and means to supply the other reproduced microphone output to the other speaker.

10. Apparatus for improving the signal-to-noise ratio in the binaural transmission of sound on two channels, said apparatus comprising two sound sources, means to add the outputs of said sound sources to obtain a summation signal, means to subtract the said outputs to obtain a subtraction signal, a superaudible subcarrier generator, means to modulate the superaudible subcarrier over substantially the full frequency range of the subtraction signal, means to combine the modulated subcarrier with substantially the full frequency range of the summation signal, a carrier generator, means to frequency modulate the carrier by means of the combined signal, and means to transmit the resulting modulated carrier, the arrangement being such that the subcarrier as well as the carrier is modulated over so much of the full frequency range of the audio signals carried thereby that a substantial improvement in signal-to-noise ratio is obtained.

11. Apparatus for improving the signal-to-noise ratio in the binaural communication of sound on two channels, said apparatus comprising two sound sources, means to add the outputs of said sound sources to obtain a summation signal, means to subtract the said outputs to obtain a subtraction signal, a superaudible subcarrier generator, means to modulate the superaudible subcarrier over substantially the full frequency range of the subtraction signal, means to combine the modulated subcarrier with substantially the full frequency range of the summation signal, a carrier generator, means to frequency modulate the carrier by means of the combined signal, and means to transmit the resulting modulated carrier, and receiver apparatus including a frequency modulation detector to demodulate the carrier, means to separate the subcarrier from the summation signal, means to demodulate the subcarrier to obtain the subtraction signal, means to add the summation and subtraction signals to reproduce one sound source output, means to subtract the said two signals to reproduce the other sound source output, spaced reproducers, and means to supply the reproduced outputs to said spaced reproducers, the arrangement being such that the subcarrier as well as the carrier is modulated over so much of the full frequency range of the audio signals carried thereby that a substantial improvement in signal-to-noise ratio is obtained.

12. Apparatus for improving the signal-to-noise ratio in the binaural reception of sound transmitted on a frequency modulation carrier and a superaudible subcarrier, said carrier and subcarrier being modulated by substantially the full frequency range of two audio signals carried thereby, said receiver apparatus including a frequency modulation detector to demodulate the carrier to obtain the modulated subcarrier and substantially the full frequency range of the carrier audio signal, means to separate the subcarrier with its signal from the carrier audio signal, means to demodulate the subcarrier to obtain substantially the full frequency range of the subcarrier audio signal, means to add the carrier and subcarrier audio signals to obtain a signal A, means to subtract the said two audio signals to obtain a signal B, spaced reproducers, and means to supply said signals A and B to said spaced reproducers, the arrangement being such that the carrier and subcarrier audio signals are reproduced over so much of their full audio frequency range that a substantial improvement in signal-to-noise ratio is obtained.

13. The method of communicating two messages on a frequency modulation carrier using a superaudible subcarrier for a second channel, which includes adding the messages and transmitting the resulting summation signal over the main carrier, subtracting the messages and raising the level of the subtraction signal and transmitting the resulting raised-level subtraction signal over the subcarrier, and at the receiver demodulating the carrier to receive the signals, separating the summation and subtraction signals, raising the level of the summation signal less than the subtraction signal to help restore the original relationship of level, so adding the two signals as to obtain one of the messages, and so subtracting the two signals as to obtain the other message.

14. The method of communicating two messages on a frequency modulation carrier using a superaudible subcarrier for a second channel, which includes adding the messages to obtain a signal, subtracting the messages to obtain another signal, raising the level of the subtraction signal transmitting one of the signals over the frequency modulation carrier acting as one channel, transmitting the other signal over the subcarrier and carrier acting as the other channel, and at the receiver demodulating the carrier, separating the subcarrier, demodulating the subcarrier, to obtain the summation and subtraction signals, raising the level of the summation signal less than the subtraction signal to help restore the original relationship of level, so adding the two signals as to reproduce one of the messages, and so subtracting the two signals as to reproduce the other message.

15. The method of binaural communication on a frequency modulation carrier using a superaudible subcarrier for a second channel, which includes adding the outputs of two sound sources to obtain a summation signal and transmitting the resulting summation signal over substantially its full audio frequency range on the main frequency modulation carrier acting as one channel, and subtracting the outputs of the two sound sources and transmitting the resulting subtraction signal over substantially its full audio frequency range on the subcarrier and carrier acting as the other channel, and at the receiver demodulating the carrier to obtain the modulated subcarrier and the carrier audio signal, separating the subcarrier with its audio signal from the carrier audio signal, demodulating the subcarrier to obtain the subcarrier audio signal, thereby deriving the summation and subtraction signals over substantially their full audio frequency range, adding the carrier and subcarrier audio signals to reproduce one sound source output, subtracting the said two audio signals to reproduce the other sound source output, and supplying the outputs to spaced reproducers.

16. The method of binaural reception of sound transmitted on a frequency modulation carrier and a superaudible subcarrier, said carrier and subcarrier being modulated by substantially the full frequency range of two audio signals carried thereby, which method includes demodulating the carrier to obtain the modulated subcarrier and substantially the full frequency range of the carrier audio signal, separating the subcarrier with its audio signal from the carrier audio signal, demodulating the subcarrier to obtain substantially the full frequency range of the subcarrier audio signal, adding the carrier and subcarrier audio signals to obtain a signal A, subtracting the said two audio signals to obtain a signal B, and supplying the signals A and B to spaced reproducers.

17. Apparatus for the binaural communication of sound on a frequency modulation carrier, said apparatus comprising spaced microphones, means to add the microphone outputs to obtain a summation signal, means to subtract the microphone outputs to obtain a subtraction signal, means to raise the level of the subtraction signal more than the summation signal is raised, a subcarrier generator, means to modulate the subcarrier by means of the subtraction signal, means to combine the modulated subcarrier with the summation signal, a frequency modulated oscillator arranged to be modulated by means of the combined signal, and receiver apparatus including means to demodulate the carrier, means to separate the subcarrier from the summation signal, means to demodulate the subcarrier to obtain the subtraction signal, means to raise the level of the subtraction signal less than the summation signal is raised in order to help restore the original relationship of level, means to add the summation and subtraction signals to reproduce one microphone output, means to subtract the said two signals to reproduce the other microphone output, spaced speakers, means to supply one reproduced microphone output to one speaker, and means to supply the other reproduced microphone output to the other speaker.

18. Apparatus for binaural transmission of sound on two communication channels having substantially different efficiencies of transmission, comprising spaced microphones, means to add the microphone outputs to attain a summation signal over substantially its full frequency range, means to transmit the summation signal over the channel having the higher efficiency of transmission, means to subtract the microphone outputs to obtain a subtraction signal over substantially its full frequency range, and means to transmit the subtraction signal over the channel having the lower transmission efficiency.

19. Apparatus for communicating two messages with equal transmission efficiencies over two communication channels having unequal transmission efficiencies, said apparatus comprising means to add the messages to obtain a summation signal, means to transmit the summation signal over the channel of maximum transmission efficiency, means to subtract the messages to obtain a subtraction signal having an amplitude lower than the summation signal, means to amplify the subtraction signal by a factor "K," means to transmit the amplified subtraction signal over the channel of minimum transmission efficiency, and receiving apparatus including means to derive the summation and subtraction signal from the channels, means to attenuate the subtraction signal by the aforesaid factor "K," means to add the summation and subtraction signals to reproduce one of the messages, and means to subtract the two signals in order to reproduce the other message.

20. Accessory apparatus for use with receiving apparatus including a frequency modulation tuner, two audio frequency amplifiers, and two spaced speakers, for the binaural reception of sound transmitted on a frequency modulation carrier and sub-carrier, the added microphone outputs being sent over the carrier, the subtracted microphone outputs being amplified more than the added microphone outputs by a factor "K," and being sent over the sub-carrier, said accessory apparatus being designed to be connected between the frequency modulation tuner and the two audio frequency amplifiers, and comprising means to separate the sub-carrier from the summation signal, means to demodulate the sub-carrier to obtain the subtraction signal, means to attenuate the subtraction signal relative to the summation signal by the factor "K," means to add the summation and subtraction signals to reproduce one microphone output for connection to one audio frequency amplifier and speaker, and means to subtract the said two signals to reproduce the other microphone output for connection to the other audio frequency amplifier and speaker.

21. Accessory apparatus for use with receiving apparatus including a frequency modulation tuner, two audio frequency amplifiers, and two spaced speakers, for the binaural reception of sound transmitted on a frequency modulation carrier and sub-carrier, the added microphone outputs being sent over the carrier, the subtracted microphone outputs being amplified more than the added microphone outputs by a factor "K," and being sent over the sub-carrier, said accessory apparatus being designed to be connected between the frequency modulation tuner and the two audio frequency amplifiers, and comprising means to separate the sub-carrier from the summation signal, limiter means to limit the subcarrier, means to demodulate the sub-carrier to obtain the subtraction signal, a deemphasis network, means to attenuate the subtraction signal relative to the summation signal by the factor "K," means to add the summation and subtraction signals to reproduce one microphone output for connection to one audio frequency amplified and speaker, and means to subtract the said two signals to reproduce the other microphone output for connection to the other audio frequency amplifier and speaker.

22. Apparatus for the binaural transmission of sound on a frequency modulation carrier and a superaudible subcarrier, said apparatus comprising two sound sources, means to add the outputs of said sound sources to obtain a summation signal, means to subtract the said outputs to obtain a subtraction signal, a subcarrier generator, means to modulate the subcarrier over substantially the full frequency range of the subtraction signal, means to combine the modulated subcarrier with substantially the full frequency range of the summation signal, means to frequency modulate a carrier by means of the combined signal, and means to transmit the resulting modulated carrier.

23. Apparatus for the binaural communication of sound on a frequency modulation carrier and superaudible subcarrier, said apparatus comprising two sound sources, means to add the outputs of said sound sources to obtain a summation signal, means to subtract the said outputs to obtain a subtraction signal, a subcarrier generator, means to modulate the subcarrier over substantially the full frequency range of the subtraction signal, means to combine the modulated subcarrier with substantially the full frequency range of the summation signal, means to frequency modulate a carrier by means of the combined signal, and means to transmit the resulting modulated carrier, and receiver apparatus including means to demodulate the carrier, means to separate the subcarrier from the summation signal, means to demodulate the subcarrier to obtain the subtraction signal, means to add the summation and subtraction signals to reproduce one sound source output, means to subtract the said two signals to reproduce the other sound source output, spaced reproducers, and means to supply the reproduced outputs to said spaced reproducers.

24. Apparatus for the binaural reception of sound transmitted on a frequency modulation carrier and a superaudible subcarrier, said carrier and subcarrier being modulated by substantially the full frequency range of two audio signals carried thereby, said receiver apparatus including a frequency modulation detector to demodulate the carrier to obtain the modulated subcarrier and substantially the full frequency range of the carrier audio signal, means to separate the subcarrier with its audio signal from the carrier audio signal, means to demodulate the subcarrier to obtain substantially the full frequency range of the subcarrier audio signal, means to add the carrier and subcarrier audio signals to obtain a signal A, means to subtract the said two audio signals to obtain a signal B, spaced reproducers, and means to supply said signals A and B to said spaced reproducers.

25. Accessory apparatus for use with receiving apparatus including a frequency modulation tuner, audio frequency amplifiers, and spaced reproducers, for the binaural reception of sound transmitted on a frequency modulation carrier and a superaudible subcarrier, said carrier and subcarrier being modulated by substantially the full frequency range of the two audio signals carried thereby, said accessory apparatus being designed to be connected between the frequency modulation tuner and the two audio frequency amplifiers, and comprising means to separate the subcarrier from the carrier audio signal over substantially its full frequency range, means to demodulate the subcarrier to obtain its audio signal over substantially its full frequency range, means to add the carrier and subcarrier audio signals to obtain a signal A, means to subtract the said carrier and subcarrier audio signals to obtain a signal B and means to supply said signals A and B to said audio frequency amplifiers and spaced reproducers.

References Cited in the file of this patent

UNITED STATES PATENTS

| | | |
|---|---|---|
| 1,685,357 | Griggs | Sept. 25, 1928 |
| 2,609,535 | Harmon | Sept. 2, 1952 |
| 2,654,885 | Wilmotte | Oct. 6, 1953 |
| 2,698,379 | Boelens et al. | Dec. 28, 1954 |
| 2,729,697 | Chatten | Jan. 3, 1956 |
| 2,779,020 | Wilmotte | Jan. 22, 1957 |
| 2,810,782 | Hester | Oct. 22, 1957 |

OTHER REFERENCES

"Electronics" Magazine for February 1952, pages 88–95.